United States Patent
Baskin et al.

(10) Patent No.: US 8,801,378 B2
(45) Date of Patent: Aug. 12, 2014

(54) LOW OFFSET HINGELESS ROTOR WITH PITCH CHANGE BEARINGS

(75) Inventors: Bryan Kenneth Baskin, Arlington, TX (US); Todd David Walker, Keller, TX (US)

(73) Assignee: Sikorsky Aircraft Corporation, Stratford, CT (US)

(*) Notice: Subject to any disclaimer, the term of this patent is extended or adjusted under 35 U.S.C. 154(b) by 767 days.

(21) Appl. No.: 13/034,271

(22) Filed: Feb. 24, 2011

(65) Prior Publication Data

US 2013/0078100 A1 Mar. 28, 2013

Related U.S. Application Data

(60) Provisional application No. 61/307,511, filed on Feb. 24, 2010.

(51) Int. Cl.
| | |
|---|---|
| *B64C 11/06* | (2006.01) |
| *B64C 27/33* | (2006.01) |
| *B64C 27/35* | (2006.01) |
| *B64C 27/37* | (2006.01) |
| *B64C 27/39* | (2006.01) |

(52) U.S. Cl.
CPC ............ *B64C 27/33* (2013.01); *B64C 27/35* (2013.01); *B64C 27/37* (2013.01); *B64C 27/39* (2013.01)
USPC ........ 416/104; 416/106; 416/107; 416/134 A; 416/135; 416/141

(58) Field of Classification Search
USPC ...... 416/104, 106, 107, 134 A, 135, 140, 141
See application file for complete search history.

(56) References Cited

U.S. PATENT DOCUMENTS

| | | | |
|---|---|---|---|
| 4,381,902 A * | 5/1983 | Head et al. ................ | 416/134 A |
| 4,804,352 A | 2/1989 | Schmidt | |
| 5,059,094 A | 10/1991 | Robinson et al. | |
| 5,242,267 A | 9/1993 | Byrnes et al. | |
| 5,563,416 A | 10/1996 | Hatakeyama | |
| 5,636,969 A | 6/1997 | Matuska et al. | |
| 5,645,400 A | 7/1997 | Hunter et al. | |
| 5,690,474 A | 11/1997 | Byrnes et al. | |
| 6,050,778 A * | 4/2000 | McArdle et al. ............. | 416/107 |
| 6,296,444 B1 | 10/2001 | Schellhase et al. | |
| 6,695,583 B2 | 2/2004 | Schmaling et al. | |
| 6,981,844 B2 | 1/2006 | Perkinson et al. | |
| 7,780,409 B2 * | 8/2010 | Kismarton ........................ | 416/1 |
| 7,845,909 B2 * | 12/2010 | Stamps et al. ............. | 416/134 A |

* cited by examiner

*Primary Examiner* — Igor Kershteyn
(74) *Attorney, Agent, or Firm* — Cantor Colburn LLP

(57) ABSTRACT

A hub assembly for a tilt rotor includes a yoke having a plurality of yoke arms located substantially orthogonal to a central axis of the hub assembly. An inboard pitch change bearing assembly substantially surrounds a yoke arm of the plurality of yoke arms. An outboard pitch change bearing assembly is located at the yoke arm. The inboard pitch change bearing assembly and the outboard pitch change bearing assembly are operably connectable with a rotor blade to allow pitch change of the rotor blade relative to the yoke about a pitch change axis.

18 Claims, 7 Drawing Sheets

LOW OFFSET HINGELESS ROTOR WITH PITCH CHANGE BEARINGS

CROSS-REFERENCE TO RELATED APPLICATIONS

This is a nonprovisonal application of U.S. Provisional Application No. 61/307,511, filed on Feb. 24, 2010, the disclosure of which is also incorporated herein by reference.

BACKGROUND OF THE INVENTION

The subject matter disclosed herein generally relates to rotors for aircraft use. More specifically, the subject disclosure relates to hub configurations for tilt rotors.

Rotor blades utilized in tilt-rotor aircraft typically must be able to pitch significantly relative to a blade pitch change axis, be capable of allowing flapping motion of the rotor blades, have proper frequency placement, proper kinematic couplings, among other requirements. To meet these requirements in the past, a gimbal-style rotor hub has been utilized as shown in FIG. 7. A gimbal style hub offers the benefit of a low head moment and, consequently, less structure required to support the rotor shaft within the gearbox and less structure required to support the gearbox on the airframe. The rotor hub 100 includes a trunnion 114, a series of drive links 106, and a thrust bearing 116 arranged at an interface of the rotor hub 100 and a rotor shaft 104. The trunnion 114 is connected to the rotor shaft 104 via splines. The links 106 are connected between the trunnion 114 and to the rotor hub 100 via a number of pillow blocks 102 thereby allowing relative motion between the hub 100 and the rotor shaft 104 while transferring torque between the rotor shaft 104 and the hub 100. The trunnion 114 is located between the upper and lower thrust bearings 116. The upper and lower thrust bearings 116 are also connected to the shaft via splines and allow relative motion between the rotor hub 100 and the rotor shaft 104 while absorbing the thrust loads of the rotor. The elastomerics within the links 106 and upper and lower thrust bearings 116 are thermally limited, which limits operations of the tilt rotor and maneuverability of the aircraft in which the tilt rotor is utilized. Further, the gimbal-style hub has many parts and is of considerable weight.

Pitch change of the blades of such a rotor is typically accommodated by inboard pitch change bearing assemblies (IPCBAs) 108 and outboard pitch change bearing assemblies (OPCBAs) 110. The IPCBAs 108 are typically located in holes through the yoke 112 of the rotor hub 100, which presents structural issues for the yoke 112, as it must react IPCBA 108 shear loads. The art would well-receive a less complex, lighter weight tilt rotor hub configuration, while maintaining lower head moments than other lightweight configurations.

BRIEF DESCRIPTION OF THE INVENTION

According to one aspect of the invention, a hub assembly for a tilt rotor includes a yoke having a plurality of yoke arms located substantially orthogonal to a central axis of the hub assembly. An inboard pitch change bearing assembly substantially surrounds a yoke arm of the plurality of yoke arms. An outboard pitch change bearing assembly is located at the yoke arm. The inboard pitch change bearing assembly and the outboard pitch change bearing assembly are operably connectable with a rotor blade to allow pitch change of the rotor blade relative to the yoke about a pitch change axis.

According to another aspect of the invention, a rotor assembly includes a hub assembly having a yoke having a plurality of yoke arms located substantially orthogonal to a central axis of the hub assembly. An inboard pitch change bearing assembly substantially surrounds a yoke arm of the plurality of yoke arms, and an outboard pitch change bearing assembly is located at the yoke arm. A rotor blade is operably connected to the inboard pitch change bearing assembly and the outboard pitch change bearing assembly such that the inboard pitch change bearing assembly and the outboard pitch change bearing assembly absorb aerodynamic loads of the rotor blade about a pitch change axis.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
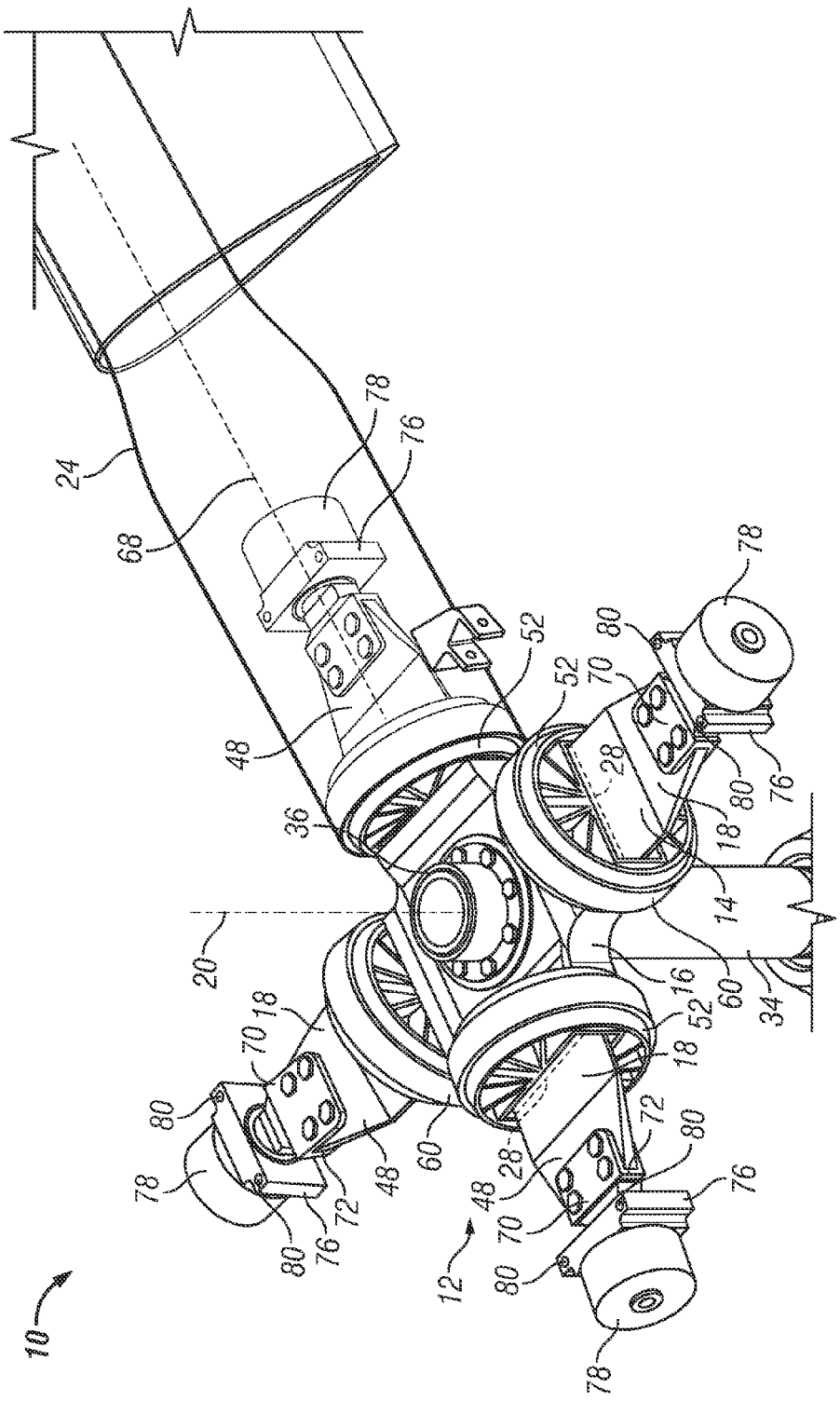
FIG. 1 is a perspective view of an embodiment of a tilt rotor hub.
Figure 2:
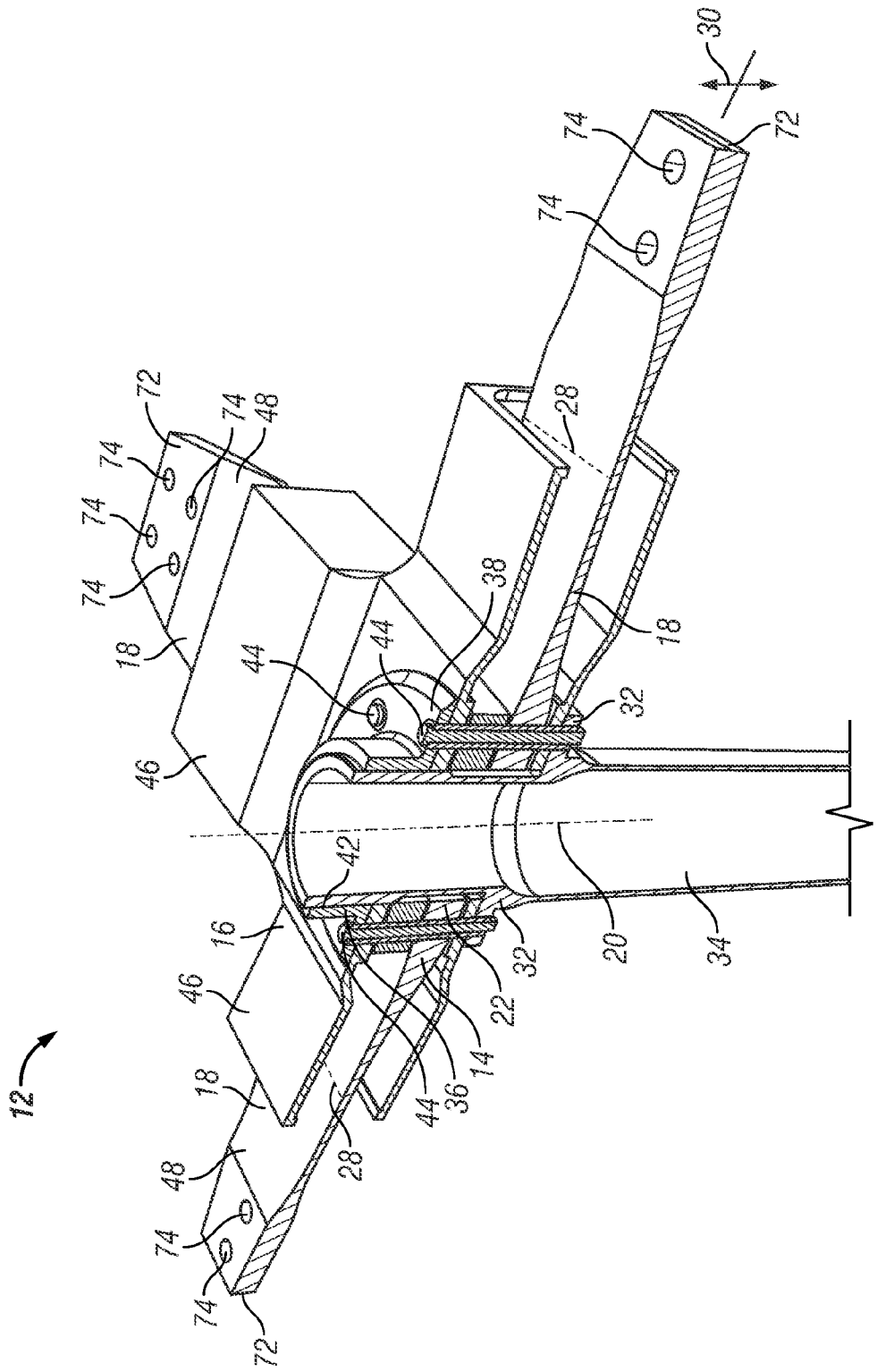
FIG. 2 is a cross-sectional view of an embodiment of a tilt rotor hub.

Referring to FIG. 1, shown is an embodiment of an improved rotor assembly 10. The rotor assembly 10 includes a rotor hub 12, best shown in FIG. 2. The rotor hub 12 includes a yoke 14 surrounded by a spindle 16. In some embodiments, the yoke 14 is constructed of at least one flex beam 18. Each flex beam 18 extends along a diameter of the yoke 14 toward a rotor axis 20. In some embodiments, each flex beam 18 extends across the rotor axis 20 and includes a hub opening 22. Each flex beam 18 is configured to be supportive of an outboard spindle 70, as shown in FIG. 1. Referring again to FIG. 2, to support additional rotor blades 24, additional flex beams 18 can be stacked at the rotor axis 20. For example, as shown, to construct a rotor hub 12 supportive of four rotor blades 24, two flex beams 18 may be stacked and offset at an angle of approximately ninety degrees about the rotor axis 20, though the flex beams 18 may be offset at other suitable angles for dynamic and/or acoustic reasons. While a rotor hub 12 supportive of four rotor blades 24 is shown in FIG. 2, it is to be appreciated that embodiments having, for example, two, three or six rotor blades 24, are contemplated within the scope of the present disclosure. Each flex beam 18 includes at least one virtual hinge line 28, which in some embodiments is located at about 5% of a rotor blade 24 length from the rotor axis 20. The virtual hinge line 28, which may comprise a thinning of the cross-section of the flex beam 18, acts as a flapping and coning hinge allowing motion of an attached rotor blade 24 in a flapping direction 30. In the prior art gimbal type hub, the flapping hinge is located within the gimbal itself which adds substantial structure and large elastomeric bearings to the gimbal and the hub.

The spindle 16 surrounds the at least one flex beam 18 and extends at least partially along a length of each flex beam 18. In some embodiments, the spindle 16 is a hollow structure and, as shown in FIG. 2, is secured to a shaft flange 32 on a rotor shaft 34, and at least one flex beam 18 at the hub opening 22. The need for a spindle 16 depends at least in part on the edgewise and beamwise shear loads the spindle 16 must have the capability to withstand. The hub opening 22 is configured to be receptive of the rotor shaft 34. A hub plate 36 is disposed at the hub opening 22 and includes an attachment flange 38 and internal spline 42. Internal spline 42 meshes with a corresponding external spline (not shown) on the rotor shaft 34. Torque is transferred from the rotor shaft 34 into the rotor hub 12 via the internal spline 42 and a plurality of hub bolts 44. While an internal spline 42 and shaft flange 32 are shown in FIG. 2, other means of transferring rotor moments and torque between the rotor shaft 34 and the rotor hub 12 are contemplated within the present scope. The yoke 14, the spindle 16, the shaft flange 32, and the hub plate 36 are joined together via the plurality of hub bolts 44 extending through the attachment flange 38, the spindle 16, the shaft flange 32 and the yoke 14.

Figure 3:
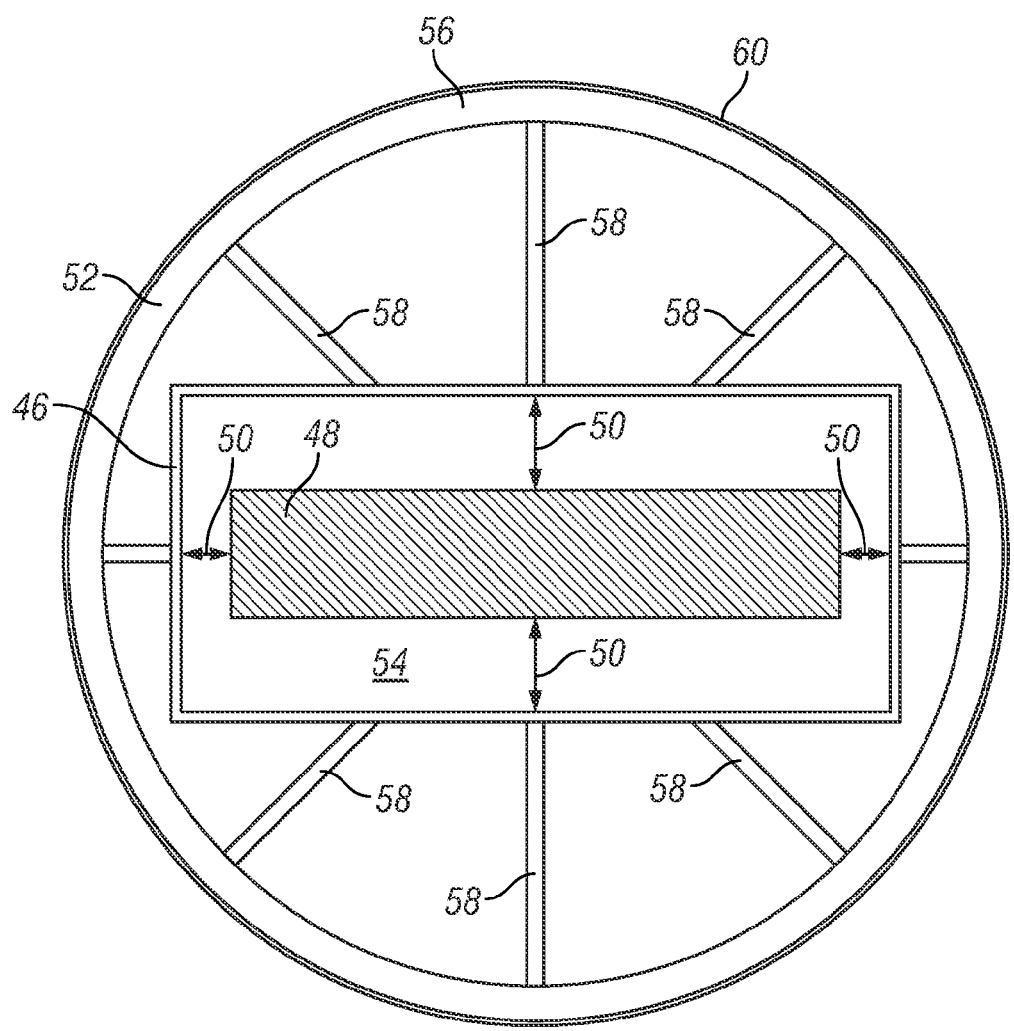
FIG. 3 is a partial cross-sectional view of an embodiment of a tilt rotor hub.

The spindle 16 may be formed from any suitable material, for example, a composite material, titanium, steel, or aluminum or an alloy thereof. The spindle 16 is configured to abut the yoke 14 at the hub opening 22, and includes a plurality of spindle arms 46 which extend along a plurality of yoke arms 48 of the yoke 14. As shown in FIG. 3, the spindle arms 46 are configured to provide a spindle gap 50 between the spindle arms 46 and the yoke arms 48 to allow movement of the yoke arms 48 relative to the spindle arms 46 during operation of the rotor assembly 10.

Figure 4:
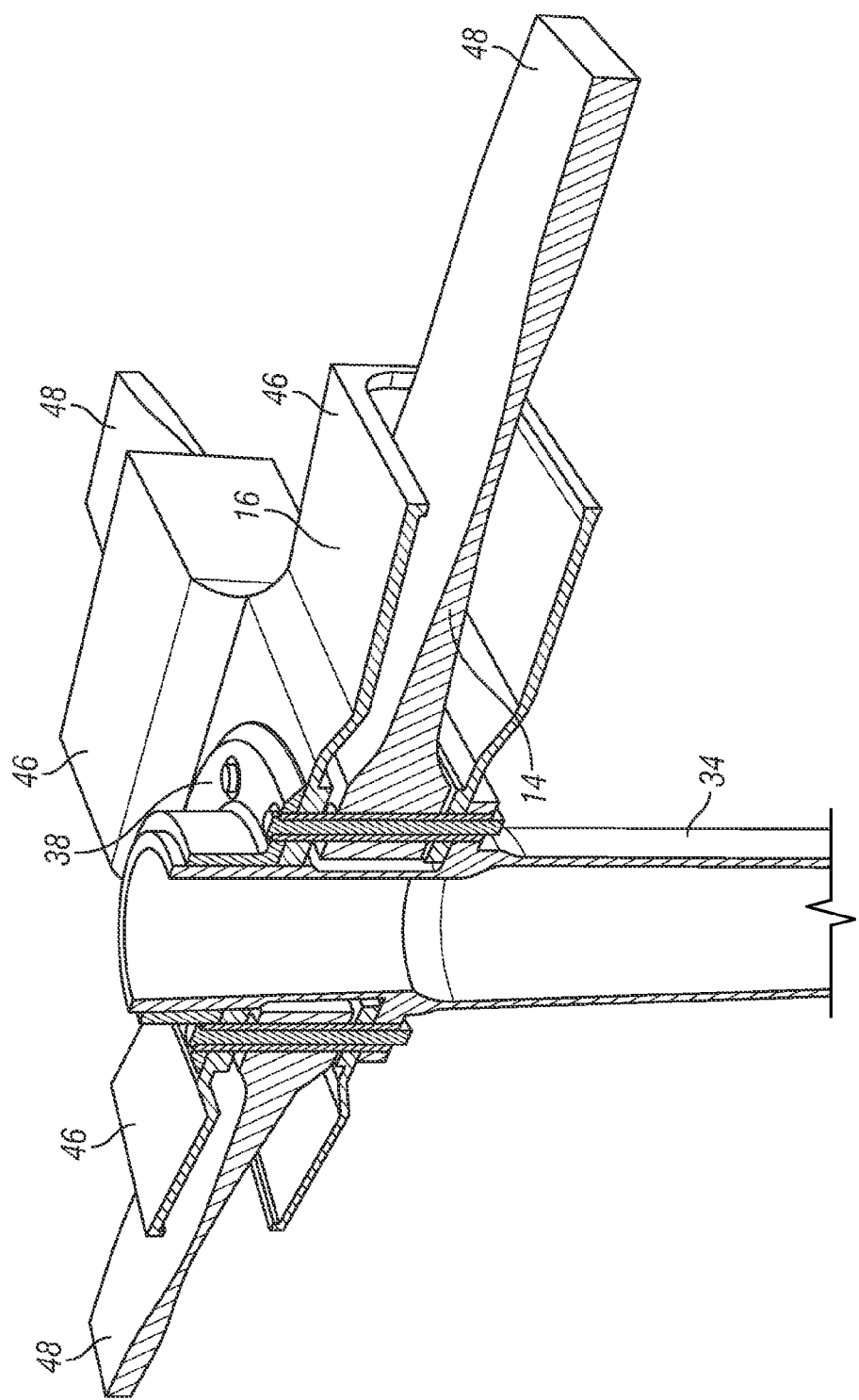
FIG. 4 is a cross-sectional view of another embodiment of a tilt rotor hub.

The spindle 16 may be formed as a unitary piece, or in some embodiments, formed of multiple pieces and assembled to facilitate a desired yoke 14 configuration. For example, if the spindle 16 is a two-piece assembly, then the multiple flex beams 18 can be consolidated into a single unitary yoke 14, such as is shown in FIG. 4.

Figure 5:
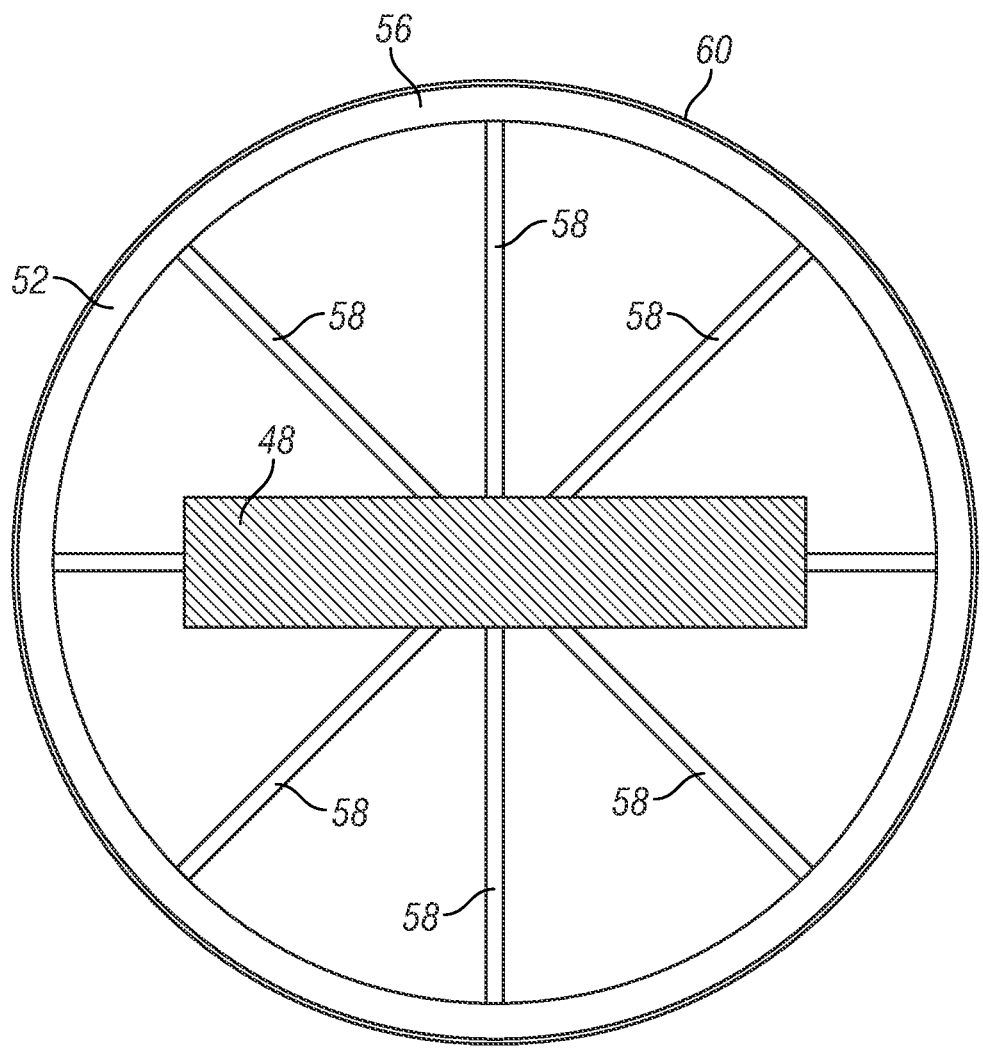
FIG. 5 is a partial cross-sectional view of another embodiment of a tilt rotor hub.

Referring again to FIG. 1, the rotor assembly 10 includes a plurality of inboard pitch change bearings (IPCBAs) 52. Each IPCBA 52 is secured to one of the spindle arms 46 of the plurality of spindle arms 46 by, for example, a plurality of bolts (not shown), and in some embodiments is located such that an IPCBA centroid is coincident with the virtual hinge line 28. It is to be appreciated, however, that other attachment means are contemplated within the present scope. Further, in some embodiments, as shown in FIG. 5, each IPCBA 52 may be secured to a yoke arm 48 rather than, or in addition to, being secured to the spindle arm 46. The ability to secure the IPCBA 52 to the yoke arm 48 depends on the ability of the yoke arm 48 to withstand the blade loads with adequate structural margin.

As shown in FIG. 3, each IPCBA 52 surrounds one of the yoke arms 48 which extends through an opening 54 in the IPCBA 52 and consequently has an inner member 56 with a width or diameter greater than a width of the yoke arm 48. To support the inner member 56, a plurality of race supports 58 extend from the opening 54 to the inner member 56. Each IPCBA 52 includes an outer race 60 located circumferentially around the inner member 56.

Figure 6:
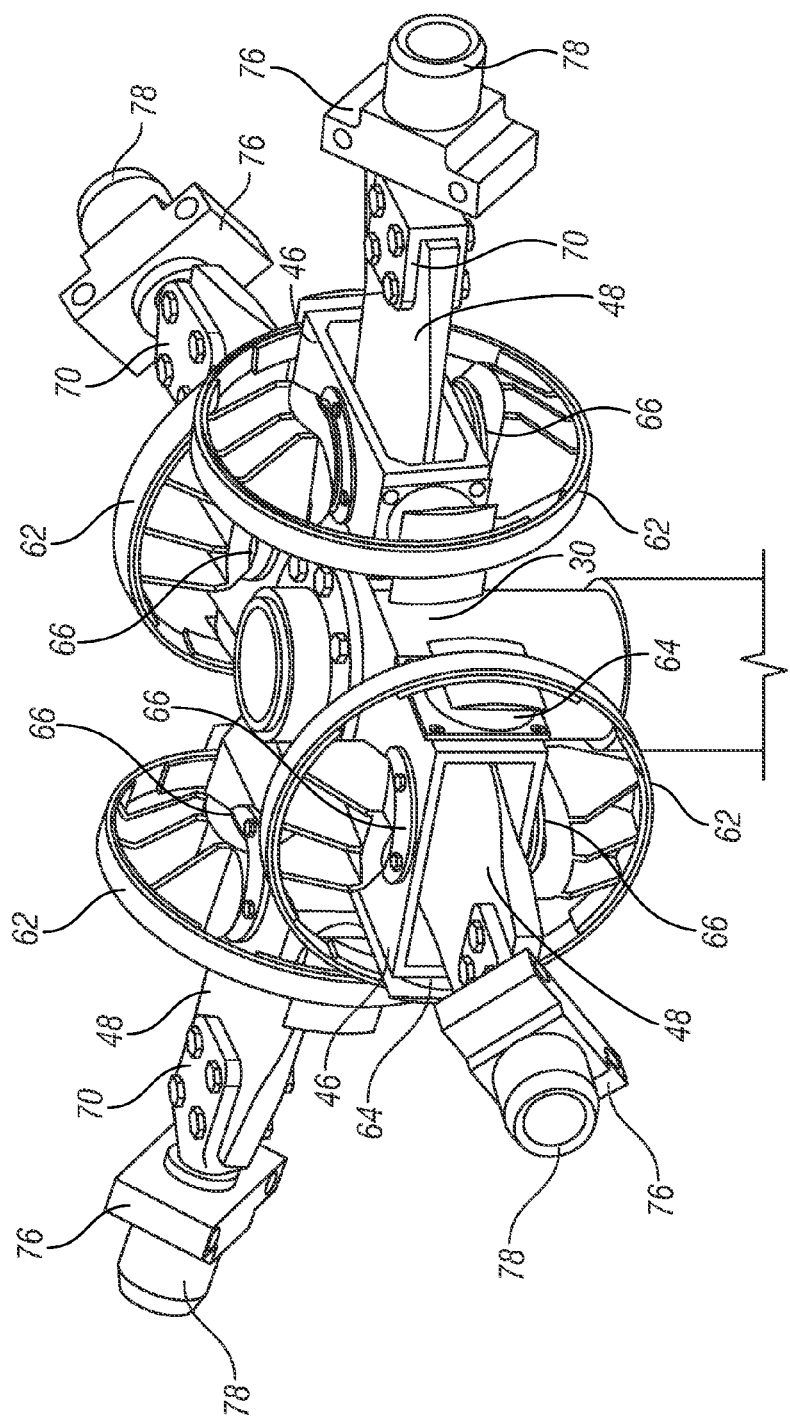
FIG. 6 is a perspective view of another embodiment of a tilt rotor hub.
Figure 7:
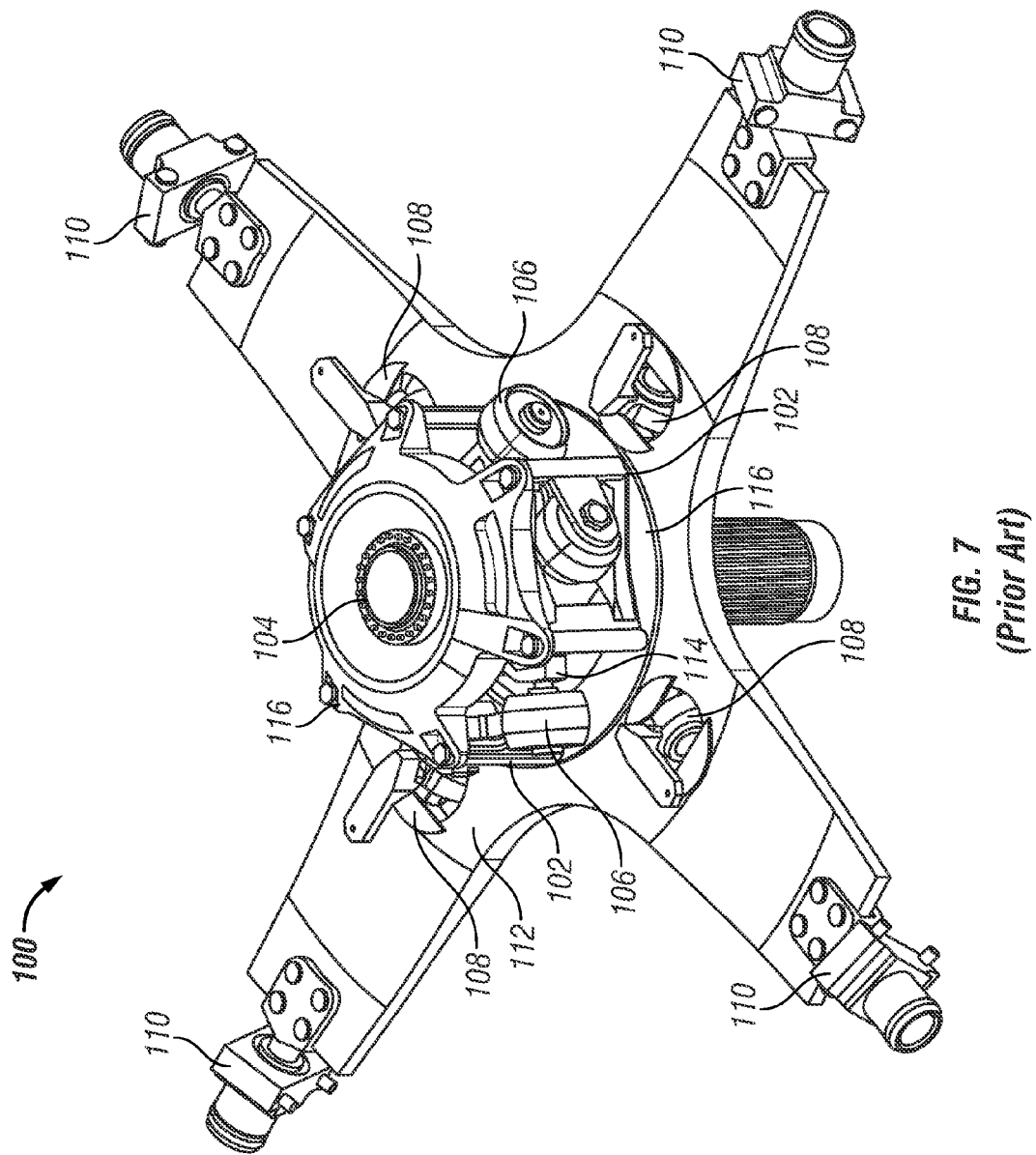
FIG. 7 is a perspective view of a typical tilt rotor hub.

For such a large spherical bearing a plain, non-lubricated bearing may be used, but may be limited depending on the liner system used between the ball and race. Another approach is illustrated in FIG. 6. The embodiment shown utilizes a roller bearing 62 which surrounds the spindle arms 46 in conjunction with elastomeric edgewise bearings 64 and elastomeric beamwise bearings 66, which connect the roller bearing 62 to the spindle arm 46. In some embodiments, the edgewise bearing 64 is a flat ring laminate, while the beamwise bearing 66 is a cylindrical or spherical laminate.

Referring again to FIG. 1, the rotor blade 24 fits around the IPCBA 52 and interfaces therewith to allow for rotation of the rotor blade 24 about a pitch change axis 68, in some embodiments up to +/−35 degrees, while minimizing torsion loads transferred to the yoke arm 48. Further, in some embodiments, the IPCBA 52 is located at the virtual hinge line 28 which allows for flap of the rotor blade 24 of about +/−10 degrees.

The outboard spindle 70 is secured to an outboard end 72 of each yoke arm 48. In some embodiments, the outboard spindles 70 are bolted through a plurality of through holes 74 in the yoke arm 48 (shown in FIG. 2). Mounted on each outboard spindle 70 is an outboard pitch change bearing assembly (OPCBA) 76 and a centrifugal force (CF) bearing 78. The OPCBAs 76, which in some embodiments are elastomeric bearings or non-lubricated bearings, include a plurality of blade attachment holes 80 for securing the rotor blade 24 to the OPCBA 76. The OPCBAs 76 are configured to react beamwise and edgewise loads generated by the rotor blade 24. The CF bearing 78 reacts centrifugal force loads of the rotor blade 24, and in some embodiments may be an elastomeric bearing or a thrust bearing.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A hub assembly for a tilt rotor comprising:
   a yoke having a plurality of yoke arms disposed substantially orthogonal to a central axis of the hub assembly;
   an inboard pitch change bearing assembly substantially surrounding a yoke arm of the plurality of yoke arms;
   an outboard pitch change bearing assembly located at the yoke arm, the inboard pitch change bearing assembly and the outboard pitch change bearing assembly operably connectable with a rotor blade to allow pitch change of the rotor blade relative to the yoke about a pitch change axis; and
   a spindle surrounding the yoke and secured thereto proximate to an axial through opening of the hub assembly.

2. The hub assembly of claim 1 wherein the yoke comprises at least one flex beam.

3. The hub assembly of claim 1 wherein the yoke comprises two stacked flex beams offset at an azimuth angle.

4. The hub assembly of claim 1 wherein the yoke arm includes at least one virtual hinge line.

5. The hub assembly of claim 4 wherein the inboard pitch change bearing assembly is disposed at a radius from the central axis substantially equal to a radial position of the at least one virtual hinge line.

6. The hub assembly of claim 1 wherein the inboard pitch change bearing assembly is secured to the yoke arm.

7. The hub assembly of claim 1 wherein the inboard pitch change bearing assembly is secured to the spindle.

8. The hub assembly of claim 1 including a hub plate secured to the spindle at the through opening, the hub plate capable of transferring torque from a rotor shaft to the hub assembly.

9. The hub assembly of claim 8 wherein the hub plate includes an internal spline operably connectable to the rotor shaft.

10. The hub assembly of claim 1 wherein the yoke arm extends through an opening in the inboard pitch change bearing assembly.

11. The hub assembly of claim 1 wherein the outboard pitch change bearing assembly is disposed at an outboard end of the yoke arm.

12. A rotor assembly comprising:
a hub assembly including:
a yoke having a plurality of yoke arms disposed substantially orthogonal to a central axis of the hub assembly; and
an inboard pitch change bearing assembly substantially surrounding a yoke arm of the plurality of yoke arms;
an outboard pitch change bearing assembly located at the yoke arm;
a rotor blade operably connected to the inboard pitch change bearing assembly and the outboard pitch change bearing assembly such that the inboard pitch change bearing assembly and the outboard pitch change bearing assembly absorb aerodynamic loads of the rotor blade about a pitch change axis; and
a spindle surrounding the yoke and second thereto proximate to an axial through opening of the hub assembly.

13. The rotor assembly of claim 12 wherein the yoke arm includes at least one virtual hinge line.

14. The rotor assembly of claim 13 wherein the inboard pitch change bearing assembly is disposed at a radius from the central axis substantially equal to a radial position of the at least one virtual hinge line.

15. The rotor assembly of claim 12 wherein the inboard pitch change bearing assembly is disposed at a point about 5% of the distance from the central axis to a rotor blade tip.

16. The rotor assembly of claim 12 wherein the inboard pitch change bearing assembly is secured to the yoke arm.

17. The rotor assembly of claim 12 wherein the inboard pitch change bearing assembly is secured to the spindle.

18. The rotor assembly of claim 12 wherein the outboard pitch change bearing assembly is disposed at an outboard end of the yoke arm.

* * * * *